Patented Mar. 9, 1954

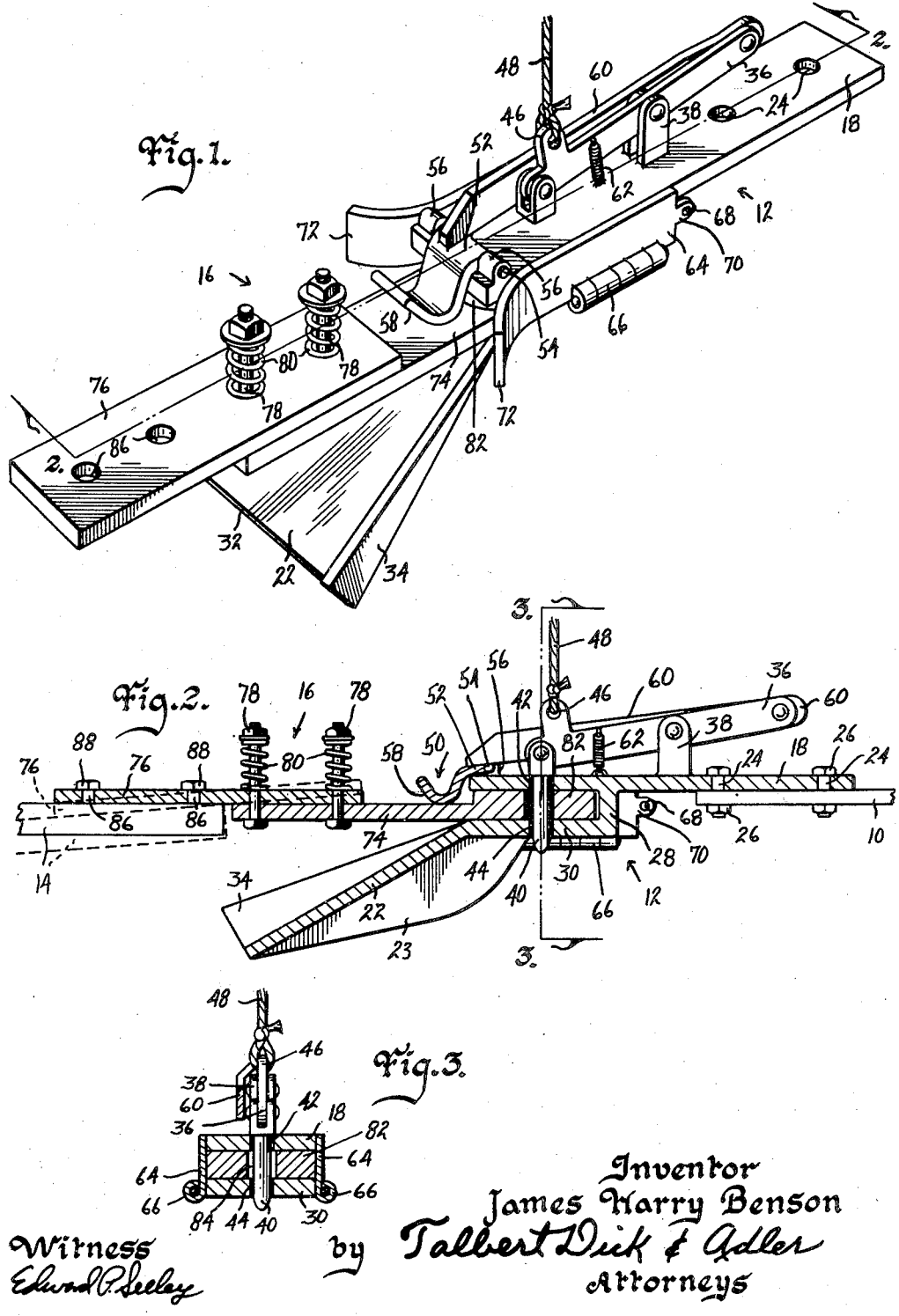

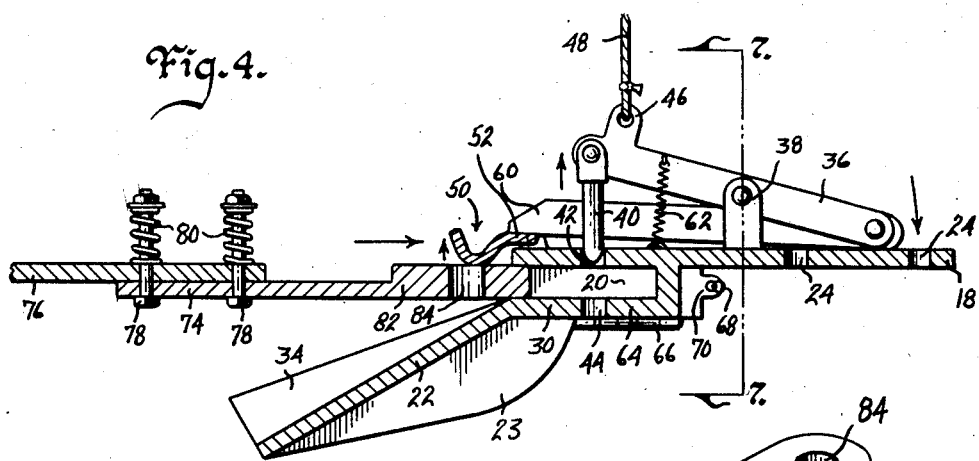
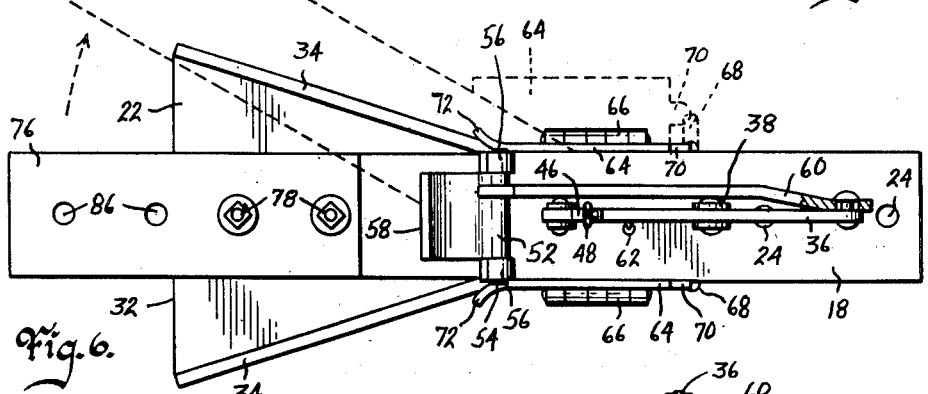
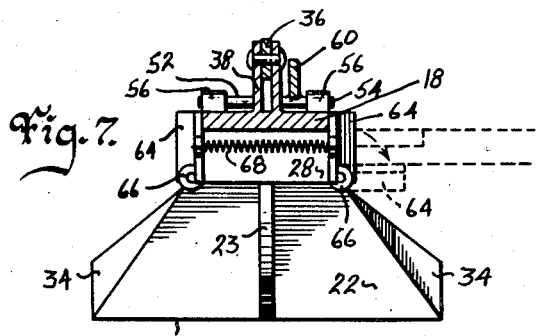

2,671,673

UNITED STATES PATENT OFFICE 2,671,673

AUTOMATIC TRACTOR HITCH

James Harry Benson, Ringsted, Iowa

Application April 4, 1952, Serial No. 280,529

5 Claims. (Cl. 280—477)

My invention relates to tractor hitches and more particularly to such hitches wherein the coupling action is automatic.

In the use of a tractor with other machinery such as balers, discs, wagons, spreaders, pickers and the like a considerable amount of time can be consumed in hitching and unhitching these various items of equipment when an automatic hitch is not available. Very often it is necessary to back the tractor to exactly the right point for coupling to another machine and this can require time consuming maneuvering that is not profitable. Many hitches also require the tractor operator to dismount for each hitching and unhitching and this adds to the time wasted. It is appreciated that some forms of automatic hitches have been devised but in my invention I shall disclose a novel type automatic tractor hitch that has advantages and structure not heretofore known.

It is the general aim of my invention to provide a tractor hitch wherein the coupling action is automatic and the tractor operator can accomplish both the hitching and unhitching without leaving his tractor seat.

More specifically I use a main clevis type coupling for mounting on the tractor and a tongue attachment for the wagon or the like. The main coupling carries a guide ramp provided with side rails and having a relatively wide outer end from which the sides converge toward the coupling means so that pin point accuracy in lining up the main hitch and tongue attachment is not necessary.

A further object of this invention is to provide a hitch means of the above class wherein the tongue is guided on three sides to the coupling means and whereby means are provided to permit the tongue to turn a full ninety degrees if necessary.

A still further object of my invention is to provide a tongue attachment for this tractor hitch that is capable of a vertical hinge action in two directions when connected to the main coupling.

Still a further object of this invention is to provide a hitch of the above class wherein the coupling means is automatically operated for coupling action in response to engagement by the tongue attachment, and capable of manual operation by means near the tractor seat for release of the coupling action.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of my coupling means and tongue attachment in operating engagement, Fig. 2 is a longitudinal section view taken on the line 2—2 of Fig. 1 and showing the coupling means attached to the drawbar on a tractor and the tongue attachment secured to a wagon tongue or the like, and further illustrating the vertical hinge action of the tongue attachment, Fig. 3 is a cross-sectional view taken on the line 3—3 of Fig. 2, Fig. 4 is a longitudinal section view in the same plane as Fig. 2 but illustrating the tongue attachment when first engaging the coupling means to show the automatic operation of the coupling means just prior to the completion of the coupling engagement, Fig. 5 is a fragmentary view of the free end of the tongue attachment to more fully illustrate its construction, Fig. 6 is a top view of this device shown in Fig. 1 with the broken lines illustrating the lateral movement of the tongue attachment, and Fig. 7 is a view partly in section taken from the line 7—7 of Fig. 4 with the broken lines illustrating the position of parts when the tongue attachment has been laterally moved.

Referring to the drawings I have used the numeral 10 (Fig. 2) to designate the draw-bar on a tractor to which my main coupling means 12 is secured. The tongue portion of a wagon, baler, disc, spreader or the like is shown at 14 and to this member the tongue attachment 16 of my hitch is secured. With reference to the main coupling means 12 an elongated bar member 18 having a clevis portion 20 (Fig. 4) on one end with a guide ramp 22 associated therewith form the base structure and these members 18—22 are all integrally formed as illustrated in Figs. 2 and 4 and the ramp preferably has a reinforcing rib 23 on its under side as illustrated. The forward portion of the bar 18 has the openings 24 to receive the nuts and bolts 26 when attached to the drawbar 10. The clevis portion 20 is formed on the under side of the rear end of bar 18 by the vertical bar 28 and the horizontal bar 30 that is parallel to and spaced from the bar 18 so that the clevis opening is to the rear and sides as illustrated. The ramp 22 is in effect a continuation of the bar 30 that extends rearwardly and downwardly therefrom with diverging sides so that its outer end 32 is relatively wider as shown in Figs. 6 and 7. On each side of the ramp 22 I provide a lateral guide rail 34 that progressively diminishes in height from rear to front so that at its juncture with the rear end of the bar 30 it provides no obstruction to the movement of an object tranversely of the ramp at this point.

An elongated lever member 36 is arranged on the bar 18 in line with the longitudinal axis thereof and is pivotally secured at a point substantially midway between its ends to a suitable support 38 secured to the bar 18. To the rear end of the lever 36 a pin 40 pivotally depends and is adapted to move into and out of the registering transverse openings 42 and 44 in the bars 18 and 30 respectively as shown in Figs. 2, 3 and 4. An apertured ear member 46 is provided on the rear end of the lever 36 and to this is secured a rope 48 or the like that extends to a suitable place on the tractor to be within reach of the operator without leaving the tractor seat. A U-shaped trip bar 50 has a projecting end portion 52 that is vertically hingedly mounted on the top side of the rear end portion of bar 18 by any suitable means such as the pin 54 in the bearing members 56. From the hinge point, the trip bar normally extends rearwardly and downwardly over and below the lowermost horizontal plane of the rear edge of bar 18 with its free end extending upwardly and rearwardly at an angle to the horizontal as illustrated at 58. Thus arranged this bar 50 serves as a movable obstruction in the path of the tongue, to be later described, as it moves into the clevis 20. A rigid bar or link 60 has one end secured as by brazing or the like to the portion 52 of the trip bar 50 and its other end pivotally connected to the forward end of lever 36 as illustrated in Figs. 1, 2, 4 and 6. A spring means 62 connects the lever 36 to the bar 18 at a point intermediate the support member 38 and the pin 40 and this spring normally tends to hold the forward or pin end of the lever in its downward position. Each of the side openings of the clevis 20 is enclosed by a door or gate 64 that is hingedly mounted at the bottom as at 66 to the bar 30 so that it will open outwardly from the top as illustrated in Fig. 7 by the broken lines. A spring means 68 extends across the outer side of bar 28 and connects to ears 70 on the gates 64 so as to normally hold the gates in closed position. Each rear portion of the gates 64 is flared outwardly as at 72 and serves as guide members at the juncture of the ramp 22 and bar 30.

The tongue attachment 16 consists of the forward and rearward bar members 74 and 76 respectively that are overlapped in longitudinal alignment as shown in Figs. 1, 2 and 4 and vertically hingedly secured together by means of a pair of bolts and nuts 78 that carry a spring means 80 intermediate the nut and the bar 76 as illustrated. The forward end of the tongue bar 74 is of greater thickness as at 82 (Fig. 5) than its main body portion and is provided with the transverse opening 84. As shown in Fig. 2 it will be observed that the thickness of portion 82 should be such as to substantially fill the vertical space within the clevis 20. The rear portion of the tongue bar 76 is provided with transverse openings 86 to receive nuts and bolts 88 when secured to the tongue 14 of a wagon or the like.

Thus constructed and arranged my new hitch will operate in the following manner. The main coupling means 12 is adapted to be secured to the drawbar 10 on a tractor and once so secured it is not necessary to remove it when not in use. The tongue attachment is mounted on the tongue portion 14 of a wagon or the like and while it may be removed and mounted on other implements such as balers, spreaders and the like to be hitched to the tractor, it will be appreciated that several implements can be separately provided with the tongue attachment to be used in connection with one main coupling on the tractor. It will also be understood that in effecting the coupling, the tongue attachment is initially elevated from the ground and this can be accomplished in a variety of well known ways such as a brace like standard secured to the wagon tongue or a lift rod which the operator can use from the tractor seat.

In hitching a tractor to an implement, the tractor is backed so the main coupling approaches the tongue attachment. At this time the clevis pin 40 is in the position shown in Fig. 2, being held there by spring 62, and obviously the forward end of lever 36 will be elevated. The wide end or mouth 32 of the ramp 22 will allow the operator considerable leeway in maneuvering the tractor as it is only necessary to have the tongue portion 82 pass between the side rails 34 to insure a successful coupling. Once this has been done, as the tractor continues backwardly, the ramp base and side rails thereon will guide the tongue toward the trip lever 50 and while the height of the side rails diminish progressively toward the lever 50, the flared ends 72 of the gates 64 serve to prevent the tongue from moving laterally off of the ramp at this point. As the tongue portion 82 engages the slanted surface 58 of the trip lever 50, this lever swings upwardly on the pin 54 and since the rear end of the rigid link 60 is secured to the trip lever at its hinge point the resulting action causes the forward end of the lever 36 to move downwardly and thus raises the pin 40 as shown in Fig. 4. Tongue portion 82 passes into the clevis 20 and as the rear extremity of tongue portion 82 moves past the trip lever so that no pressure is being exerted against this lever, spring 62 returns the pin 40 to the position shown in Fig. 2 at which time the opening 84 in the tongue is then registering with the openings 42 and 44 in the bars 18 and 30 respectively and the coupling is complete. To disengage the pin 40, it is only necessary for the operator to pull the rope or cord 48 and this will raise the lever 36 independently of the link 60 due to its pivotal connection therewith.

As turns are negotiated the tongue attachment will, of course, be in positions at an angle to the longitudinal axis of the main coupling and when this occurs the gates will yield to contact from the tongue and open outwardly as illustrated in Fig. 6. When straight travel is again resumed the spring 68 will return the gates to closed position.

The purpose and advantages of the gates 64 reside in the position and function of the flared edges 72 thereon. It will be appreciated that if the side rails 34 on the ramp did not diminish in height as described they would still serve to guide the tongue into engagement with the trip lever where the coupling action would result as described. However, such a rail would provide lateral obstructions on the ramp at the point where it joins the bar 30 and consequently lateral movement of the tongue in turns would be impossible. By my construction, however, the flared edges 72 on the gates 64 provide a lateral guide element for the ramp at the points where the side rails cease to serve that purpose and thus the edges 72 and rails 34 together provide a continuous guide surface from the mouth of the ramp to the clevis 26.

The hinge action described for the tongue attachment allows two way vertical hinge movement that decreases substantially the strain on the coupling means when the tractor is negotiating rough ground.

Some changes may be made in the construction and arrangement of my automatic tractor hitch without departing from the real spirit and purpose of my invention, and it is my intention to cover by my claims, any modified forms of structure or use of mechanical equivalents which may be reasonably included within their scope.

I claim:

1. In an automatic tractor hitch, a coupling means, comprising, a bar member designed to be attached at one end to a tractor or the like, a clevis portion integrally formed on the other end of said bar member and provided with vertically spaced apart registering openings, a lever member arranged on said bar member parallel to the longitudinal axis thereof and pivotally secured thereto at a point intermediate its ends, a pin pivotally secured at one end to one end of said lever and depending therefrom said pin movable into and out of said registering openings, yielding means to normally hold said pin in said openings, a ramp integrally formed with said clevis portion and extending outwardly and downwardly therefrom with diverging sides, a guide rail on each side of said ramp that progressively diminishes in height from the outer end of said ramp to the juncture point with said clevis portion so that at said point there is no lateral obstruction on the ramp to an object moving transversely thereof, a trip lever hingedly secured at one end to said clevis portion and extending therefrom in a U-shaped path across the clevis opening to provide a movable obstruction to an object moving toward said clevis portion, a rigid link connecting the hinged end of said trip lever to said lever at its end opposite said pin, a gate member enclosing each side of said clevis portion and hingedly secured thereto so as to open outwardly at times, yielding means to normally hold said gates in closed position, said gates each having a flared end adjacent the respective sides of said ramp at the juncture point thereof with said clevis portion, a tongue attachment, comprising, a rear tongue bar member designed to be secured to the tongue of an implement to be pulled, a forward tongue bar having a forward end portion of greater thickness than its main body portion and provided with a transverse opening, said tongue bars yieldingly secured in overlapping longitudinal alignment so as to be capable of a vertical hinge action, the coupling action of this device occurring by the movement of said coupling means toward said tongue member whereby the forward end of the tongue rides on said ramp into engagement with said trip lever and moves said trip lever upwardly to cause the link member to remove the pin from the clevis portion by depressing that end of the pin holding lever opposite to the pin, at which time the tongue opening registers with the openings through the clevis and as the thickened tongue portion moves out of engagement with the trip lever, the first mentioned yielding means returns the pin to locked position.

2. A device as defined in claim 1 in which said tongue is capable of a lateral pivotal movement on said pin so as to be at an angle to the longitudinal axis of said bar member and in said movement the gates will yield to the contact from said tongue and open so that the lateral movement of the tongue is not obstructed.

3. In an automatic tractor hitch, a coupling means, comprising, a bar member designed to be attached at one end to a tractor or the like, a clevis portion integrally formed on the other end of said bar member and provided with vertically spaced apart registering openings, a lever member arranged on said bar member parallel to the longitudinal axis thereof and pivotally secured thereto at a point intermediate its ends, a pin pivotally secured at one end to one end of said lever and depending therefrom said pin movable into and out of said registering openings, yielding means to normally hold said pin in said openings, a ramp integrally formed with said clevis portion and extending outwardly and downwardly therefrom, a trip lever hingedly secured at one end to said clevis portion and extending therefrom in a U-shaped path across the clevis opening to provide a movable obstruction to an object moving toward said clevis portion, a rigid link connecting the hinged end of said trip lever to said lever at its end opposite said pin, a rear tongue bar member designed to be secured to the tongue of an implement to be pulled, a forward tongue bar having a forward end portion of greater thickness than its main body portion and provided with a transverse opening, said tongue bars yieldingly secured in overlapping longitudinal alignment so as to be capable of a vertical hinge action, the coupling action of this device occurring by the movement of said coupling means toward said tongue member whereby the forward end of the tongue rides on said ramp into engagement with said trip lever and moves said trip lever upwardly to cause the link member to remove the pin from the clevis portion by depressing that end of the pin holding lever opposite to the pin, at which time the tongue opening registers with the openings through the clevis and as the thickened tongue portion moves out of engagement with the trip lever, the first mentioned yielding means returns the pin to locked position.

4. In an automatic tractor hitch, a coupling means, comprising, a bar member designed to be attached at one end to a tractor or the like, a clevis portion integrally formed on the other end of said bar member and provided with vertically spaced apart registering openings, a lever member arranged on said bar member parallel to the longitudinal axis thereof and pivotally secured thereto at a point intermediate its ends, a pin pivotally secured at one end to one end of said lever and depending therefrom said pin movable into and out of said registering openings, yielding means to normally hold said pin in said openings, a ramp integrally formed with said clevis portion and extending outwardly and downwardly therefrom, a trip lever hingedly secured at one end to said clevis portion and extending therefrom in a U-shaped path across the clevis opening to provide a movable obstruction to an object moving toward said clevis portion, a rigid link connecting the hinged end of said trip lever to said lever at its end opposite said pin, a tongue bar member designed to be secured to the tongue of an implement to be pulled, said tongue bar having a forward end portion of greater thickness than its main body portion and provided with a transverse opening, the coupling action of this device occurring by the movement of said coupling means toward said tongue member whereby the forward end of the tongue rides on said ramp into engagement with said trip lever and moves said trip lever upwardly to cause the link member to remove the pin from the clevis portion by depressing that end of the pin holding lever opposite to the pin, at which time the tongue opening registers with the openings through the clevis and as the thickened tongue portion moves out of engagement with the trip lever, the first mentioned yielding means returns the pin to locked position.

5. In an automatic tractor hitch, a coupling means, comprising, a bar member designed to be attached at one end to a tractor or the like, a clevis portion integrally formed on the other end of said bar member and provided with vertically spaced apart registering openings, a lever member arranged on said bar member parallel to the longitudinal axis thereof and pivotally secured thereto at a point intermediate its ends, a pin pivotally secured at one end to one end of said lever and depending therefrom said pin movable into and out of said registering openings, yielding means to normally hold said pin in said openings, a ramp integrally formed with said clevis portion and extending outwardly and downwardly therefrom with diverging sides, a guide rail on each side of said ramp that progressively diminishes in height from the outer end of said ramp to the juncture point with said clevis portion so that at said point there is no lateral obstruction on the ramp to an object moving transversely thereof, a trip lever hingedly secured at one end to said clevis portion and extending therefrom in a U-shaped path across the clevis opening to provide a movable obstruction to an object moving toward said clevis portion, a rigid link connecting the hinged end of said trip lever to said lever at its end opposite said pin, a gate member enclosing each side of said clevis portion and hingedly secured thereto so as to open outwardly at times, yielding means to normally hold said gates in closed position, said gates each having a flared end adjacent the respective sides of said ramp at the juncture point thereof with said clevis portion, a tongue bar member designed to be secured to the tongue of an implement to be pulled, said tongue bar having a forward end portion of greater thickness than its main body portion and provided with a transverse opening, the coupling action of this device occurring by the movement of said coupling means toward said tongue member whereby the forward end of the tongue rides on said ramp into engagement with said trip lever and moves said trip lever upwardly to cause the link member to remove the pin from the clevis portion by depressing that end of the pin holding lever opposite to the pin, at which time the tongue opening registers with the openings through the clevis and as the thickened tongue portion moves out of engagement with the trip lever, the first mentioned yielding means returns the pin to locked position.

JAMES HARRY BENSON.

References Cited in the file of this patent

UNITED STATES PATENTS

| Number | Name | Date |
|---|---|---|
| 945,683 | Beydler | Jan. 4, 1910 |
| 2,168,148 | Arehart | Aug. 1, 1939 |
| 2,556,748 | Buckley | June 12, 1951 |
| 2,612,382 | Landis | Sept. 30, 1952 |

FOREIGN PATENTS

| Number | Country | Date |
|---|---|---|
| 341,284 | Great Britain | Jan. 15, 1931 |
| 537,062 | Germany | Oct. 30, 1931 |